United States Patent [19]

Futai et al.

[11] 4,058,481
[45] Nov. 15, 1977

[54] METHOD OF ELIMINATING FOAM APPEARING ON A LIQUID SURFACE

[75] Inventors: Norio Futai; Toshio Murakami; Yoshimasa Takahara, all of Chiba; Toshiharu Kumazawa, Fujisawa, all of Japan

[73] Assignees: Mitsubishi Precision Co., Ltd.; Director-General of the Agency of Industrial Science and Technology, both of Japan

[21] Appl. No.: 707,514

[22] Filed: July 22, 1976

[30] Foreign Application Priority Data

July 26, 1975 Japan .................. 50-91469

[51] Int. Cl.² ............................................ B01D 19/00
[52] U.S. Cl. .................... 252/321; 252/358; 252/361
[58] Field of Search .................. 252/321, 358, 361

[56] References Cited

U.S. PATENT DOCUMENTS

| | | | |
|---|---|---|---|
| 3,356,348 | 12/1967 | Paul | 252/361 X |
| 3,846,330 | 11/1974 | Graf | 252/361 |

Primary Examiner—Benjamin R. Padgett
Assistant Examiner—E. Suzanne Parr
Attorney, Agent, or Firm—Merchant, Gould, Smith, Edell, Welter & Schmidt

[57] ABSTRACT

A method of eliminating liquid foam appearing on the surface of a liquid content in a reaction vessel is characterized by employing a liquid particle diffusion device with a liquid ejecting nozzle element and a liquid diffusing element for radially diffusing the liquid circulated from the reaction vessel in the form of liquid particles having kinetic energy. The liquid particles hit and break the foam thereby eliminating the foam.

6 Claims, 4 Drawing Figures

METHOD OF ELIMINATING FOAM APPEARING ON A LIQUID SURFACE

FIELD OF THE INVENTION

The present invention relates generally to a method of eliminating liquid foam and more particularly relates to a method of physically collapsing and eliminating liquid foam of the type in which the foam coming out of a liquid content in a reaction vessel during the process of supplying oxygen into the liquid content and stirring the liquid content are forcedly broken and eliminated by liquid particles diffused by a liquid particle diffusion device having a liquid ejection nozzle element and a liquid particle diffusing element.

BACKGROUND OF THE INVENTION

In some conventional reaction processes, for example, a culturing process of microbes, it is required that air or oxygen be supplied into a reaction liquid within a reaction vessel. In order to supply a required amount of air or oxygen into the reaction liquid, a method is widely used in which the air or oxygen is fed from the bottom of the vessel into the reaction liquid content by way of an appropriate air supply means, such as an air diffusion tube, so that the contact of the air or oxygen with the reaction liquid is actively performed. Further, the liquid content is usually stirred within the reaction vessel by employing an appropriate type of stirrer. However, in the case where a nitric component of the organic state is contained in the reaction liquid content or in the case of a biosynthesis of protein, such as culturing of microbes, the occurrence of liquid foam is extremely intensified. Thus, if it is desired to avoid applying any chemical defoamer to the reaction liquid, and if the conventional air supplying and stirring method is employed, the foam generated will necessarily occupy a great extent of the inner volume of the reaction vessel. As a result, the amount of the reaction liquid content to be charged into the reaction vessel must be kept small so as to prevent the generated foam from overflowing the reaction vessel. Further, in the case of culturing the microbes, the amount of microbes being displaced from the liquid content into the generated foam often becomes larger than that of the microbes remaining in the liquid content and as a result, the culturing efficiency must be kept low.

In some cases, a mechanical defoaming device having defoaming wings or a method of impacting foams by sound waves is used for collapsing foams appearing on the surface of a reaction liquid content in a reaction vessel. However, in both cases, additional complicated mechanisms or equipments including an electric power supply source for causing rotation of the defoaming wings, or a supply source of high-pressure gases for generating the sound waves are required. Therefore, there are many disadvantages from an economical perspective in view of the maintenance and life of the complicated mechanisms or equipments. Further, such defoaming device or impacting method often fails to eliminate the foam, if the occurrence of the foam is extremely turbulent.

Particularly in the case of the production of single cell proteins made from the raw materials of hydrocarbons such as normal paraffin or methane, the occurrence of the liquid foam is a serious problem to be solved. That is to say, in the case of hydrocarbon fermentation, a large amount of oxygen is required, and also the substrate must be emulsified in water, since the substrate is not soluble in water. Therefore, stirring of the emulsified culturing liquid must always be required. As a result, the amount of the occurrence of foam gradually increases during the middle of the culturing time period. As the culturing process approaches the final stage, the occurrence of foam on the surface of the reaction liquid rapidly increases. Thus, eliminating the foam which appears on the culturing medium liquid is indispensably required not only for attaining a normal culturing process but also for enhancing the culturing efficiency. However, no simple and effective method of eliminating foam has been acquired.

BRIEF SUMMARY OF THE INVENTION

An object of the present invention is therefore to provide a novel method of eliminating foam of the type in which the foam appearing on a surface of a liquid content received in a reaction vessel is physically broken or collapsed so as to return the broken foam into the liquid content.

Another object of the present invention is to provide a method of simply and effectively eliminating liquid foam requiring no particular maintenance operation during the employment of the method in a reaction vessel.

Still another object of the present invention is to provide a liquid foam eliminating method applicable to any existing reaction vessel.

According to the present invention, there is provided a liquid foam eliminating method in which a liquid particle diffusion device with a liquid ejecting nozzle element and a liquid diffusing element is employed for radially diffusing a liquid circulated from a reaction vessel, in the form of liquid particles which hit and break liquid foam appearing on a wide extent of the surface of the liquid received in the reaction vessel. By the method, the liquid particle diffusion device is located within the reaction vessel so that the liquid ejecting nozzle element faces and is upwardly spaced apart from the liquid surface. The circulation of the liquid from the reaction vessel to the liquid particle diffusion device is performed by a suitable pumping means for applying a pressure to the liquid. The circulated liquid is ejected from the liquid ejecting nozzle element and impinges upon the liquid diffusing element mounted in front of the ejecting nozzle element. The liquid diffusion element diffuses the impinged liquid at a large diffusing angle with respect to the ejecting axis of the liquid ejecting nozzle element, in the form of liquid particles radially directing toward the liquid surface within the reaction vessel. The larger the diffusing angle of the liquid particles becomes, the wider is the extent of the liquid surface onto which the diffused liquid particles reach. Thus, preferably, the distance between the ejecting end of the liquid ejecting nozzle element and the liquid diffusing element is selected so as to be 10 or less millimeters irrespective of the pressure under which the liquid is circulated from the reaction vessel to the liquid particle diffusion device. Otherwise, preferably, the pressure under which the liquid is circulated from the reaction vessel to the liquid particle diffusion device is selected so that the liquid is ejected from the liquid ejecting nozzle element at a gauge pressure of 0.5 or more kilograms per square centimeter. As a result of these two selections, it is possible to effectively utilize the kinetic energy of the diffused liquid particles for breaking and eliminating the liquid foam appearing on the surface of the liquid content in the reaction vessel. Further, the employment of the liquid particle diffusion device with the liquid diffusing element cooperating with the liquid ejecting nozzle element provides for a larger diameter in the nozzle element as compared with that of any known type of liquid injection nozzles, since the liquid is diffused by the diffusing element at a large diffusing angle and since the pressure of the ejected liquid from the nozzle element can be relatively small compared with the pressure of the injected liquid from any known type of liquid injection nozzles. The large diameter of the liquid ejecting nozzle element is able to prevent with certainty the nozzle element from obstructions during the ejection of a liquid.

An embodiment of the present invention is hereinafter described, by way of example only, with reference to the accompanying drawings wherein.

Figure 1:
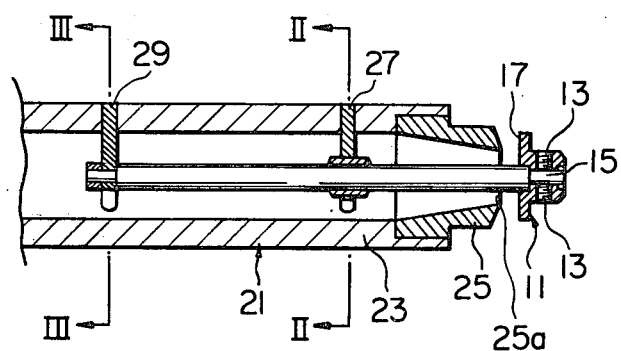
FIG. 1 is a longitudinal cross section, partly cut away, of a liquid particle diffusion device employed in a method of eliminating liquid foam according to the present invention.
Figure 3:
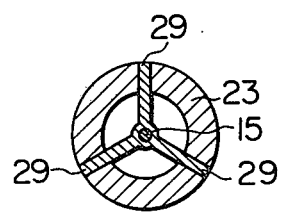
FIGS. 2 and 3 are cross sections taken along the lines II—II and III—III of FIG. 1, respectively.
Figure 2:
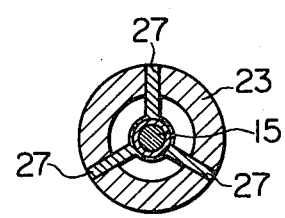

Referring to FIGS. 1 through 3, a liquid particle diffusion device is provided with a liquid diffusing element 11 having a round-shape liquid impinging surface 17. The liquid diffusing element 11 is attached to an end of a supporting rod 15 by means of screws 13, such as set screws. The liquid particle diffusion device is also provided with a liquid ejecting nozzle element 21 which has a tubular member 23 and a nozzle member 25 having a liquid ejecting nozzle 25a at its extreme end. The nozzle member 25 is fixed to a front end of the tubular member 23. The supporting rod 15 is rigidly supported within the tubular member 23 by means of front arms 27 and rear arms 29, as shown in FIGS. 2 and 3. As is obvious from FIG. 1, the liquid impinging surface 17 of the liquid diffusing element 11 is arranged so as to oppose the liquid ejecting nozzle 25a of the nozzle member 25. The distance between the surface 17 and the nozzle 25a is preferably set so as to be 10 or less millimeters. When a liquid flowing in the tubular member 23 is ejected from the nozzle member 25, the ejected liquid immediately impinges upon the surface 17 of the diffusing element 11, and is then diffused toward the space surrounding the diffusing element 11.

Figure 4:
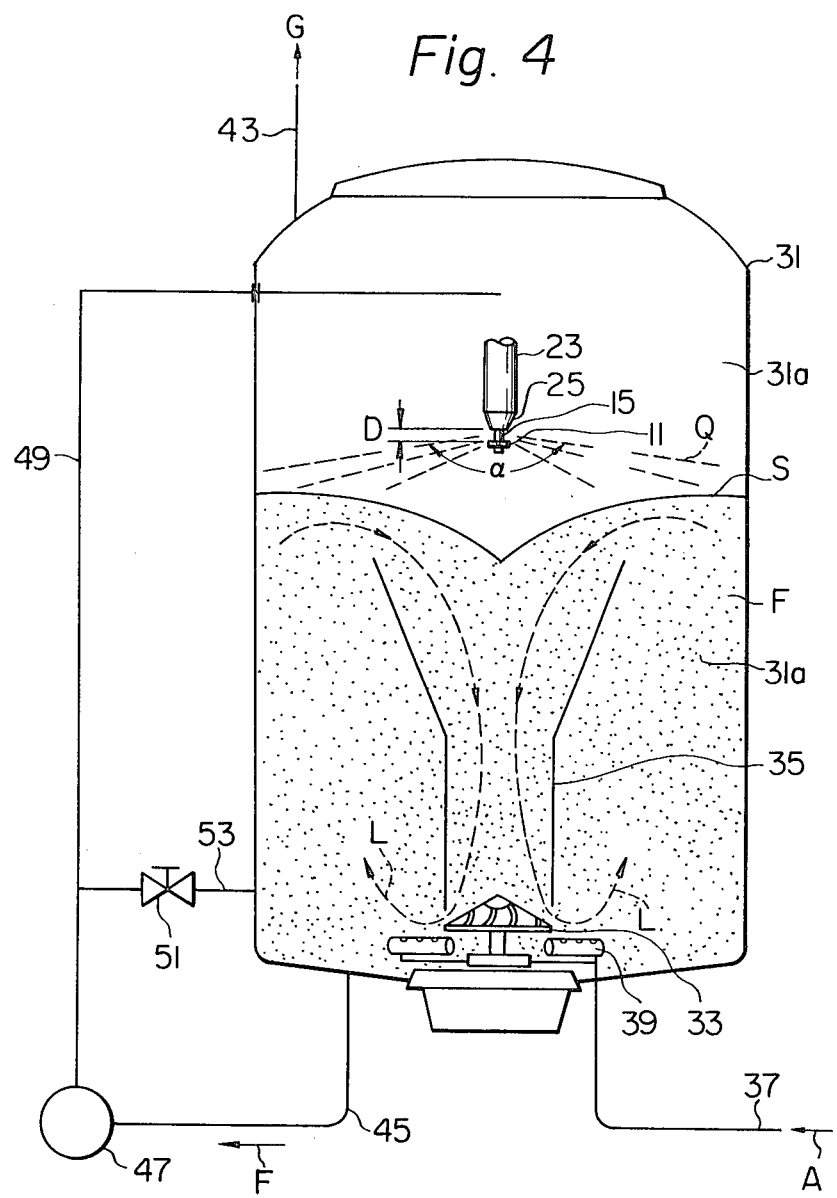
FIG. 4 is a schematical view of a reaction vessel in which the diffusion device of FIGS. 1 through 3 is mounted for use in performing the method of the present invention.

Referring to FIG. 4, a reaction vessel 31 having an inner closed chamber consisting of a lower space 31a receiving a fixed amount of reaction liquid F and an upper free space 31b left above a surface S of the reaction liquid F. An agitator 33 is positioned at the lowermost portion of the reaction vessel 31 so as to stir a portion of the reaction liquid F adjacent to the bottom of the reaction vessel 31. When the liquid F is stirred, a circulating flow of the reaction liquid F is formed within the reaction vessel 31 in the directions shown by the broken arrow lines L with the aid of a draft tube 35 placed in the reaction liquid F. A pipeline 37 is provided for introducing air or oxygen gas A into the reaction vessel 31 through an air diffuser 39 so that the oxygen gas component is supplied into the reaction liquid F. An exhaust pipeline 43 is provided for releasing a gas G generated during the reaction process from the free space 31b of the reaction vessel 31.

A distribution pipeline 45 running from the bottom of the reaction vessel 31 to a liquid pump 47 is provided for retracting a fixed amount of the reaction liquid F from the reaction vessel 31 per each minute. The retracted reaction liquid F is then sent to the liquid particle diffusion device mounted within the reaction vessel 31 under a pressure applied by the liquid pump 47, by way of another distribution pipeline 49. Subsequently, the liquid F is ejected from the nozzle member 25 of the diffusion device. The ejected reaction liquid F subsequently impinges upon the diffusing member 11 and is diffused in the form of a high speed radial flow Q of liquid particles at a diffusing angle $\alpha$. Preferably, the diffusing angle $\alpha$ of the liquid particle flow Q is adjusted so as to be 180°. That is to say, the adjustment is performed so that the liquid particles are diffused at a right angle with respect to the vertical axis of the liquid particle diffusion device. The diffused liquid particles subsequently direct toward the surface S of the reaction liquid F and break foam on the surface S due to their kinetic energy. The amount of the liquid particles diffused from the liquid particle diffusion device may be varied depending on the amount of liquid foam occurring on the surface S of the reaction liquid F within the vessel 31. It should be understood that the variation of the amount of the liquid particles can be attained by adjusting the amount of the reaction liquid, which is ejected by the nozzle member 25, through adjusting the power of the liquid pump 47. In some cases, the above variation of the amount of the liquid particles may be attained by returning a part of the liquid F sent through the distribution pipeline 49 into the reaction vessel 31 by way of a regulating valve 51 and a return pipeline 53. Naturally, the amount of the liquid particles diffused from the liquid particle diffusion device is selected so as to be optimum for physically collapsing and eliminating the foam which appears on the liquid surface S within the reaction vessel 31. Further, in response to the change in the kind of reaction liquid F and in response to the change in the shape and size of the reaction vessel 31, the distance "D" between the nozzle of the nozzle member 25 and the diffusing element 11 together with the shape and size of the impinging surface of the diffusing element 11 may be varied so that the efficiency of elimination of the foam becomes maximum. Also, if required, more than one liquid particle diffusion devices may be disposed in parallel with one another within the free space 31b of the reaction vessel 31.

To further illustrate the present invention, and not by way of limitation, two examples are hereinbelow given.

EXAMPLE 1

In the process of producing single cell protein from a raw material of the normal paraffin, the elimination of foam which appeared on a culturing liquid surface during the production process was performed in accordance with the arrangement shown in FIG. 2. That is to say, 230 l of the culturing liquid medium the inorganic ammonium sulphate were placed in the reaction vessel 31 having an inner diameter of 750 mm and a capacity of 500 l. The culturing liquid medium in the reaction vessel 31 was first subjected to a heat sterilization process for 30 minutes under the pressure of 1 kg/cm$^2$G. Thereafter, the culturing medium liquid was cooled down to a temperature of 30° C, and then yeasts were inoculated into the sterilized culturing liquid medium. Subsequently, culturing of the yeasts was processed for thirty hours while supplying an equivalent amount of air (1V.V.M.) into the culturing liquid medium per each minute and stirring the liquid medium at a rate of 1,000 R.P.M. Tables 1 and 2 below show the results of the comparison between the case where the method of eliminating foam according to the present invention was employed and the case where a conventional defoaming device having stirring wings was employed. In the case of employing the eliminating method of the present invention, the diameter of the nozzle of the used liquid particle diffusion device was selected so as to be 15 mm, and the distance between the front end of the nozzle member and the diffusing member was set to be 2 mm. Further, the culturing liquid medium was sent from the reaction vessel to the liquid particle diffusion device at a rate of 50 l per minute.

Table 1

Foam Eliminating Results During the Production process of Single Cell Proteins from Normal Paraffin (Normal Paraffin 2%)

| Time lapse | Foam occurrence state in the case of employing the conventional defoaming device | Foam eliminating effect in the case of employing the method of the present invention |
| --- | --- | --- |
| 10 HRS. | The occurrence of foam was very turbulent, and the foam overflowed from the vessel. | The foam was completely eliminated. |
| 20 HRS. | " | " |
| 30 HRS. | " | " |

Table 2

Foam Eliminating Results During the Production Process of Single Cell Proteins from Normal Paraffin (Normal Paraffin 3%)

| Time lapse | Foam occurrence state in the case of employing the convention defoaming device | Foam eliminating effect in the case of employing the method of the present invention |
| --- | --- | --- |
| 10 HRS. | The occurrence of foam was very turbulent, and the foam overflowed from the vessel. | The foam was completely eliminated. |
| 20 HRS. | " | " |
| 30 HRS. | " | " |

EXAMPLE 2

The affects of varying distances between the front end of the nozzle member 25 and the diffusing member 11 on the foam eliminating effect were tested under the following conditions. That is, the liquid used for the test was a commercially sold soft detergent. The diameter of the nozzle of the ejecting nozzle member 25 was selected to be 15 mm. The rate of the air supply was 1V.V.M. The number of the rotation of the stirrer was 1,000 R.P.M. The foam eliminating effects of the method of the present invention are shown in Table 3, below.

Table 3

| Distance (mm) | Concentration of the soft detergent (G/230l) | | | | | | | | Pressure of the Ejection of the liquid (kg/cm²G) |
| --- | --- | --- | --- | --- | --- | --- | --- | --- | --- |
| | 1 | 2 | 3 | 4 | 5 | 6 | 7 | 8 | |
| 9 | + | ± | − | − | − | | | | 0.5 |
| 8 | + | ± | ± | ± | − | − | | | 0.5 |
| 7 | + | + | ± | ± | ± | ± | − | | 0.55 |
| 6 | + | + | ± | ± | ± | ± | − | | 0.55 |
| 5 | + | + | ± | ± | ± | − | − | | 0.6 |
| 4 | + | + | ± | ± | ± | − | − | | 0.65 |
| 3 | + | + | ± | ± | ± | − | − | | 0.7 |
| 2 | + | + | + | + | + | + | + | | 1.0 |

In Table 3, the three symbols +, ± and − designate the following results.
+ : The foam was completely eliminated.
± : The foam appearing on the central part of the liquid surface was eliminated, but at the peripheral part of the liquid surface, a small amount of the foam was not eliminated.
− : The foam was not eliminated.

From Table 3, it can be understood that the foam eliminating effect of the method of the present invention is very remarkable when the distance between the nozzle of the liquid ejecting nozzle member and the diffusing member is selected to be 10 or less millimeters. This is because the liquid particles are diffused at a right angle with respect to the vertical axis of the liquid ejecting nozzle member of the liquid particle diffusion device used for the method of the present invention.

What is claimed is:

1. A method of eliminating foam appearing on a surface of a fixed amount of liquid content received within a reaction vessel which retains a free inner space left above said surface of said liquid content comprising:
locating a liquid ejecting nozzle member and a subsequent diffusing member at a position within said free inner space of said reaction vessel and away from said surface of said liquid content, said diffusing member being spaced at a preselected distance from said nozzle member such that the liquid particles ejected at a wide angle from said nozzle member impinge upon said diffusing member;
retracting a partial amount of said liquid content from said vessel through a conduit means;
sending said partial amount of said liquid content to said liquid ejecting nozzle member through a second conduit means under a predetermined pressure exerted by a liquid pumping means, and;
diffusing said partial amount of said liquid content through said diffusing member in the form of said liquid particles having therein kinetic energy against said foam thereby causing said foam on said surface of said liquid content to collapse and vanish.

2. A method of eliminating foam as set forth in claim 1, wherein the preselected distance between said nozzle member and said diffusing member is set at 10 or less millimeters irrespective of the pressure under which said partial amount of said liquid content is sent to said nozzle member of said liquid particle diffusing means.

3. A method of eliminating foams as set forth in claim 1, wherein the pressure under which the partial amount of said liquid content is sent to said liquid particle diffusing means is set so that said liquid is ejected from said nozzle member at a gauge pressure of 0.5 or more kilograms per square centimeter.

4. A method of eliminating foam as set forth in claim 1, wherein the retraction of said partial amount of said liquid content is performed by a pumping means capable of pumping a preselected volume of said liquid content per minute.

5. A method of eliminating foam as set forth in claim 4, wherein said pumping means retracting said liquid from said reaction vessel and said pumping means for sending said liquid content to said liquid particle diffusing means consist of a common liquid pump interposed between the first and second conduit means.

6. A method of eliminating foam as set forth in claim 1, wherein the position where said liquid particle diffusing means lies on a vertical axis about which said surface of said liquid content extends symmetrically.

* * * * *